United States Patent
Bali et al.

(10) Patent No.: US 9,344,990 B1
(45) Date of Patent: May 17, 2016

(54) DEVICE LOCATION ACCURACY METRICS FOR APPLICATIONS ON WIRELESS COMMUNICATION DEVICES

(71) Applicant: Sprint Communications Company L.P., Overland Park, KS (US)

(72) Inventors: Soshant Bali, Danville, CA (US); Sara Gatmir-Motahari, Millbrae, CA (US); Hui Zang, Cupertino, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 328 days.

(21) Appl. No.: 13/691,941

(22) Filed: Dec. 3, 2012

(51) Int. Cl.
*H04W 4/02* (2009.01)
*H04W 64/00* (2009.01)

(52) U.S. Cl.
CPC ..................... *H04W 64/00* (2013.01)

(58) Field of Classification Search
CPC ......... H04B 1/00; H04B 17/00; H04M 11/00; H04M 1/00; H04M 1/38; H05M 3/00; H04W 4/00; H04W 24/00; H04W 68/00; H04W 4/003; H04W 4/02; H04L 67/00; G01C 21/12
USPC ................. 455/41.2, 67.11, 404.2, 418–420, 455/433–434, 456.1–456.6, 457–459, 455/550.1, 556.2, 561; 701/445–447, 701/450–455, 467–473, 482, 495, 516–517
See application file for complete search history.

(56) References Cited

U.S. PATENT DOCUMENTS

| | | | |
|---|---|---|---|
| 6,947,734 B1 | 9/2005 | Toubassi | |
| 7,228,136 B2 | 6/2007 | Myllymaki et al. | |
| 8,160,610 B2 | 4/2012 | Harper et al. | |
| 8,213,617 B1 * | 7/2012 | Appleton | 380/270 |
| 8,265,658 B2 * | 9/2012 | Issa et al. | 455/456.3 |
| 8,412,237 B1 * | 4/2013 | Ohme | 455/456.3 |
| 8,806,519 B2 * | 8/2014 | Scellato et al. | 725/14 |
| 8,855,681 B1 * | 10/2014 | George et al. | 455/456.3 |
| 2003/0126264 A1 * | 7/2003 | Chithambaram et al. | 709/227 |
| 2007/0093257 A1 * | 4/2007 | McDougall et al. | 455/456.1 |
| 2007/0109186 A1 * | 5/2007 | Fujiwara et al. | 342/357.09 |
| 2007/0149214 A1 * | 6/2007 | Walsh et al. | 455/456.1 |
| 2007/0205941 A1 | 9/2007 | Riley et al. | |
| 2009/0219209 A1 * | 9/2009 | Bush et al. | 342/450 |
| 2010/0009696 A1 * | 1/2010 | Fok et al. | 455/456.1 |
| 2010/0134631 A1 * | 6/2010 | Voth et al. | 348/169 |
| 2010/0325194 A1 * | 12/2010 | Williamson et al. | 709/203 |
| 2011/0077021 A1 * | 3/2011 | Mizikovsky et al. | 455/456.1 |
| 2011/0078137 A1 * | 3/2011 | Sudit et al. | 707/722 |
| 2011/0149756 A1 * | 6/2011 | Chan et al. | 370/252 |
| 2011/0159884 A1 * | 6/2011 | Chawla | 455/456.1 |
| 2011/0282988 A1 * | 11/2011 | Wang et al. | 709/224 |
| 2011/0300875 A1 * | 12/2011 | Kim et al. | 455/456.1 |
| 2012/0309376 A1 * | 12/2012 | Huang et al. | 455/418 |
| 2013/0172020 A1 * | 7/2013 | Aweya et al. | 455/457 |

* cited by examiner

*Primary Examiner* — Meless Zewdu

(57) ABSTRACT

A data processing system determines the geographic accuracy of device locations used by applications executed by wireless communication devices. The system processes communication data for the wireless communication devices to individually correlate the device locations with the applications that used the device locations and with the wireless communication devices that executed the applications. The system processes the device locations for pairs of the wireless communication devices and the applications to determine geographic accuracy data for the pairs. The system aggregates the geographic accuracy data for individual ones of the applications to generate geographic accuracy metrics for the individual applications.

10 Claims, 5 Drawing Sheets

DEVICE LOCATION ACCURACY METRICS FOR APPLICATIONS ON WIRELESS COMMUNICATION DEVICES

TECHNICAL BACKGROUND

Users operate wireless communication devices to communicate with other devices and access the Internet over wireless communication networks. The wireless communication devices execute software applications that use device locations to provide a myriad of location-based services. A few examples are weather applications, social applications, search applications, and the like. The applications use different types of device location data. One type of device location is a highly-accurate Global Position Satellite (GPS) location provided by an internal GPS receiver. Another type of device location is the moderately-accurate network triangulation location that is based on wireless signal strength and/or delay between the wireless communication device and multiple network base stations. A third type of device location is the low-accuracy base-station location that is based on the centroid of the cell sector occupied by the wireless communication device.

There are currently millions of wireless communication devices executing millions of applications. A multitude of new devices and applications are being developed as well. Many of these devices and applications will use device locations that consume device and network resources. The accuracy of these device locations may not fit the user's purpose for the application and may result in a waste of resources. For example, a weather application may not require GPS accuracy, and the user may not desire the extra battery drain. The accuracy of device locations may also raise privacy concerns. Unfortunately, it is difficult to assess the geographic accuracy of the device locations used by the applications in wireless communication devices.

Technical Overview

A data processing system determines the geographic accuracy of device locations used by applications executed by wireless communication devices. The system processes communication data for the wireless communication devices to individually correlate the device locations with the applications that used the device locations and with the wireless communication devices that executed the applications. The system processes the device locations for pairs of the wireless communication devices and the applications to determine geographic accuracy data for the pairs. The system aggregates the geographic accuracy data for individual ones of the applications to generate geographic accuracy metrics for the individual applications.

DETAILED DESCRIPTION

Figure 1:
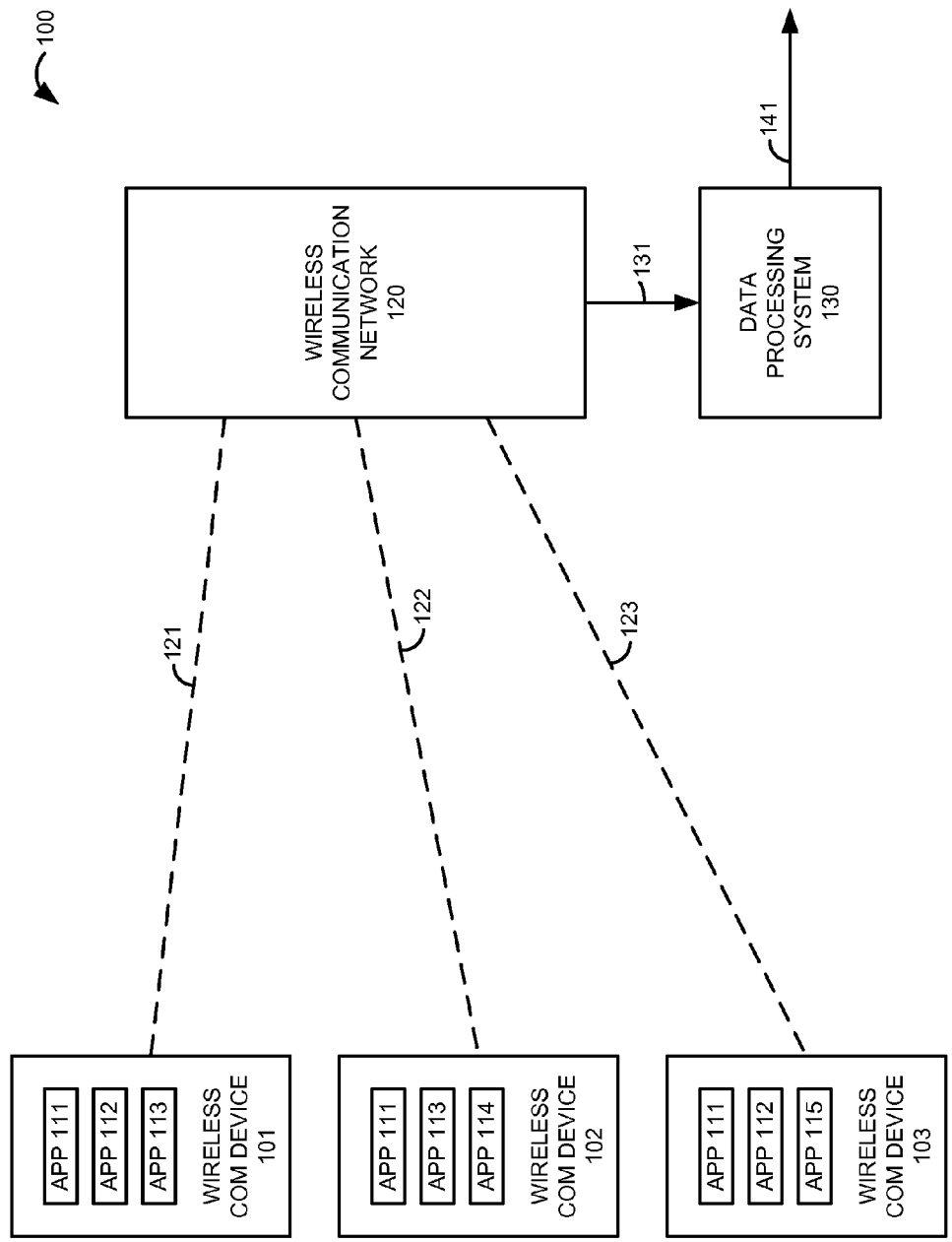
FIG. 1 illustrates a communication system with a data processing system to generate geographic accuracy metrics for applications in wireless communication devices.

FIG. 1 illustrates communication system 100 having data processing system 130 to generate geographic accuracy metrics 141 for applications 111-115 in wireless communication devices 101-105. Communication system 100 comprises: wireless communication devices 101-103, wireless communication network 120, and data processing system 130. Wireless communication device 101 executes applications 111, 112, and 113. Wireless communication device 102 executes applications 111, 113, and 114. Wireless communication device 103 executes applications 111, 112, and 115. Applications 111-115 use device locations to render location-based services or perform some other task. The typical number of wireless communication devices and applications is much larger and has been reduced for clarity on FIG. 1.

Wireless communication devices 101-103 comprise phones, computers, media players, machine transceivers, and/or some other apparatus having wireless networking components. Wireless communication network 120 comprises computer and communication systems, such as base stations, access points, gateways, servers, signaling processors, backhaul systems, and the like. Wireless communication network 120 is representative and comprises one or more wireless technologies deployed by one or more network operators. Data processing system 130 comprises a computer and communication system.

Applications 111-115 comprise software modules that direct device operations when executed by wireless communication devices 101-103. A few examples of applications 111-115 include weather applications and search applications, although there are many applications that use device locations to render location-based services. Wireless communication devices 101-103 and wireless communication network 120 communicate over respective wireless communication links 121-123. These user communications include many of the device locations used by applications 111-115. Wireless communication network 120 transfers network communication data 131 to data processing system 130. Network communication data 131 comprises a copy or version of the user communications occurring over wireless communication links 121-123—including the device locations used by applications 111-115.

Data processing system 130 processes network communication data 131 to individually correlate device locations with the individual applications 111-115 that used the device locations and with the individual wireless communication devices 101-103 that executed those applications 111-115. Thus, data processing system 130 correlates device/application pairs with their device locations.

Data processing system 130 processes the device locations for individual device/location pairs to determine geographic accuracy data for each pair. The data processing determines statistical features of device locations, such as geographic location entropy, geographic block entropy, location revisit ratio, radius of gyration, and/or some other statistically significant data point. Data processing system 130 processes the statistical features to determine geographic accuracy data for the device/application pair. In some examples, the geographic accuracy data associates the device/application pair with a location accuracy category, such as high, medium, or low accuracy.

Data processing system 130 aggregates the geographic accuracy data by application to generate geographic accuracy metrics 141 for individual applications 111-115. In some examples, a geographic accuracy metric associates an individual application with a location accuracy category, such as high, medium, or low accuracy. These high, medium, and low categories may correspond to the respective accuracies of GPS location (high), network trilateration location (medium), and transceiver location (low).

Figure 2:
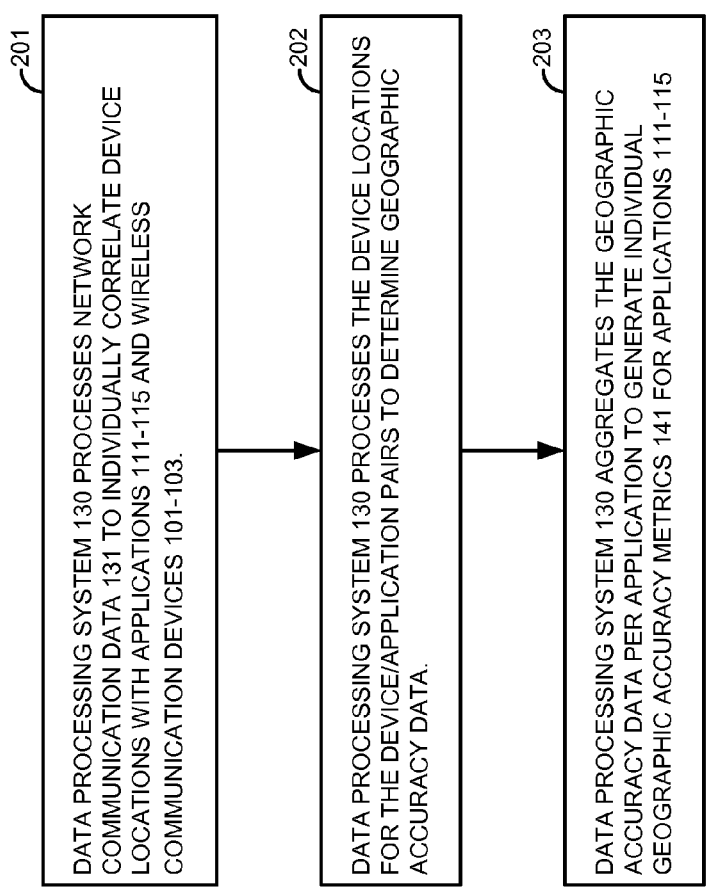
FIG. 2 illustrates the operation of the data processing system to generate geographic accuracy metrics for applications in wireless communication devices.

FIG. 2 illustrates the operation of data processing system 130 to generate geographic accuracy metrics for applications 111-115 in wireless communication devices 101-105. Data processing system 130 processes network communication data 131 to individually correlate device locations with applications 111-115 and wireless communication devices 101-103. (201) Thus, data processing system 130 correlates the device/application pairs with their respective device locations.

Data processing system 130 processes the device locations for the device/application pairs to determine geographic accuracy data. (202) This processing may determine and analyze geographic location entropy, geographic block entropy, location revisit ratios, radii of gyration, and/or some other statistically significant feature for device location data. The area of a block for the block entropy determination might be 400 square meters, although other block sizes could be used.

Data processing system 130 aggregates the geographic accuracy data per application to generate individual geographic accuracy metrics 141 for applications 111-115 (203). In some examples, a geographic accuracy metric for a given application indicates the accuracy by category such as high, medium, or low. These high, medium, and low categories may correspond to the respective accuracies of GPS location (high), network trilateration location (medium), and transceiver location (low).

Figure 3:
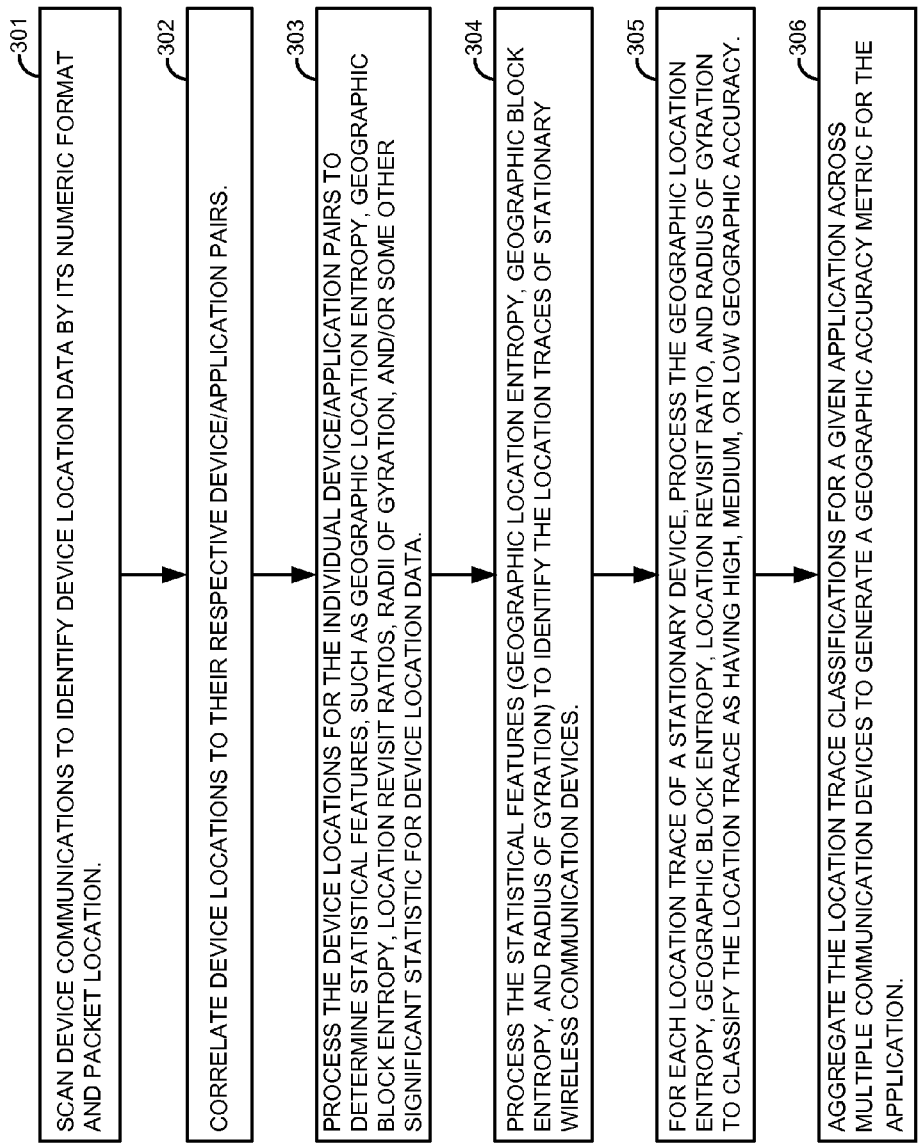
FIG. 3 illustrates an exemplary data processing operation to generate geographic accuracy metrics for wireless communication device applications.

FIG. 3 illustrates an exemplary data processing operation to generate geographic accuracy metrics for wireless communication device applications. Data processing system 130 might use this exemplary operation, although system 130 may use variations of this operation instead. The data processing system scans device communications to identify device location data by its numeric format and packet location. (301) The data processing system then correlates device locations to their respective device/application pairs. (302) This process entails detecting user IDs, Internet addresses, uniform resource locators to identify users and applications from the user traffic. This process also removes device location data that does correspond to the known network serving sector for the device—as may occur when the detected location data is for another device in a different sector. The data processing operation processes the device locations for the individual device/application pairs to determine statistical features, such as geographic location entropy, geographic block entropy, location revisit ratios, radii of gyration, and/or some other significant statistic for device location data (303).

Location entropy characterizes the variation and randomness of a location trace and could be:

$$H(X)=\Sigma^K[(x_i/M \cdot \log(x_i/M)];$$

where
  $H(X)$=location entropy,
  $K$=number of visited locations,
  $M$=total visits to all locations, and
  $x_i$=the number of visits to location i.

Block entropy equalizes locations within the same 20 m×20 m blocks and could be:

$$H(Y)=\Sigma^L[(y_j/N \cdot \log(y_j/N)];$$

where
  $H(Y)$=block entropy,
  $L$=number of visited blocks,
  $N$=total visits to all blocks, and
  $y_j$=the number of visits to block i.

Location Revisit Ratio could be:

$$LRR=R/K;$$

where
  $R$=number of re-visits to any locations, and
  $K$=total number of visited locations.

Radius of gyration measures the footprint of the trace and could be:

$$r_g(K)=\sqrt{[1/K \Sigma^K(r_k-r_c)^2]};$$

where
  $r_g(K)$=radius of gyration,
  $K$=the number of locations,
  $r_k$=location k from 1 to K, and
  $r_c$=location of the trace centroid.

For a given device/application pair, data processing system 130 processes the statistical features (geographic location entropy, geographic block entropy, and radius of gyration) to identify the location traces of stationary wireless communication devices (304). Stationary wireless communication devices have low location entropy, low block entropy, and low radius of gyration. Mobile wireless communication devices have a higher location entropy, higher block entropy, and higher radius of gyration. A clustering algorithm, such as K-nearest neighbor, can be used to compare the statistical features of a given location trace to the known statistical features of mobile and stationary devices to classify a given location trace as stationary or mobile.

For each location trace of a stationary device, the data processing operation processes the geographic location entropy, geographic block entropy, location revisit ratio, and radius of gyration to classify the location trace as having high, medium, or low geographic accuracy (305). A trace having high location entropy, low block entropy, low location revisits, and a small radius of gyration uses high-accuracy GPS device locations. A trace having medium-to-high location entropy, low block entropy, and medium-to-high location revisits uses medium-accuracy network-trilateration device locations. A trace having medium-to-low location entropy, low block entropy, and high location revisits uses low-accuracy cell sector device locations. A clustering algorithm, such as K-nearest neighbor, can be used to compare the statistical features of a given location trace to the known statistical features of high, medium, and low accuracy traces to classify a given location trace as high, medium, or low accuracy.

The data processing operation aggregates the location trace classifications for a given application across multiple communication devices to generate a geographic accuracy metric for the application (306). The geographic accuracy metric for an application is typically its most common trace classification: GPS (high), network trilateration (medium), and sector location (low). Numeric scoring and aggregation could also be used. In addition, a confidence factor may also be provided to indicate the coherence of a given trace classification, device/application pair classification, and/or application classification.

Figure 4:
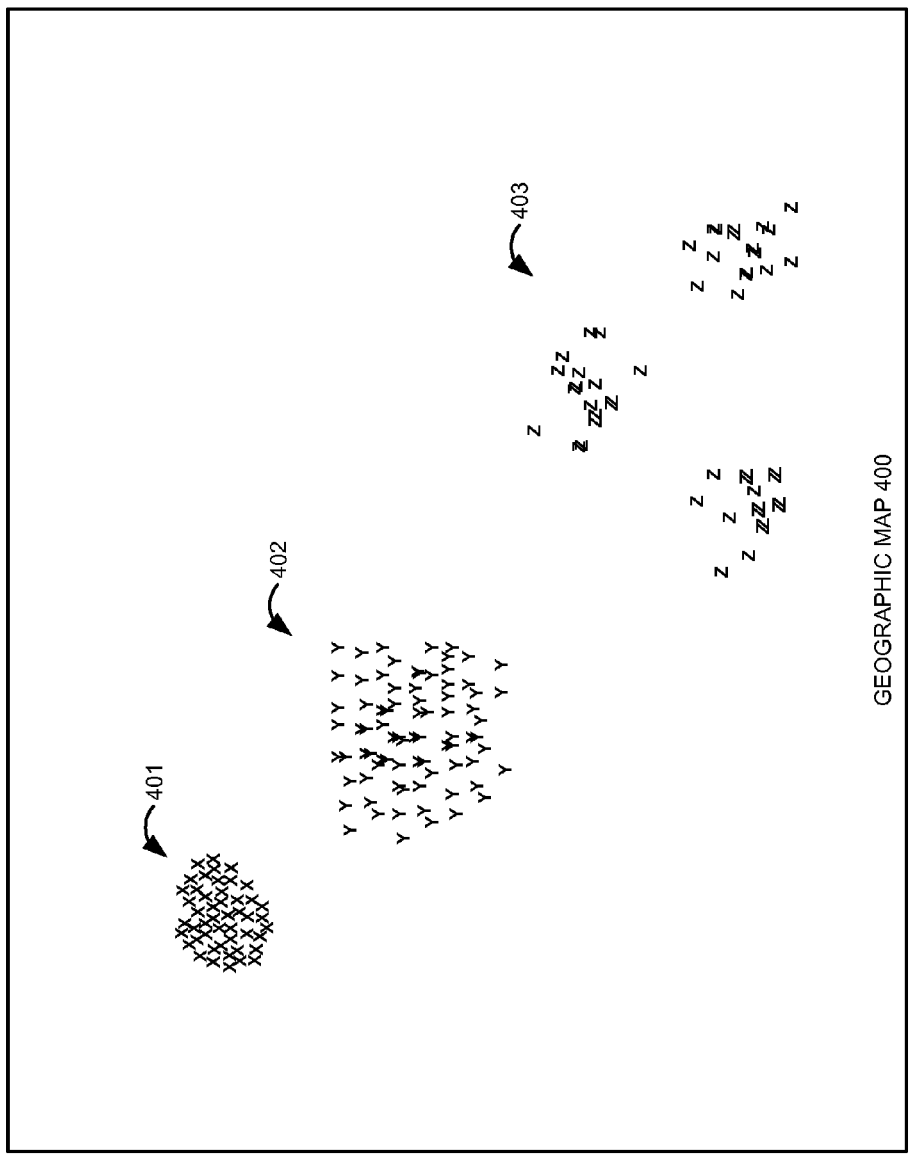
FIG. 4 illustrates three comparative traces using device locations for three device/application pairs.

FIG. 4 illustrates geographic map 400 that shows three comparative traces 401-403 of the device locations for three device/application pairs. Note that these wireless communication devices are stationary. Location trace 401 (X marks) exhibits high location entropy within a small area and few location revisits which indicates the use of high-accuracy GPS device locations. Location trace 402 (Y marks) exhibits medium-high location entropy over a larger area and moderate location revisits which indicates the use of medium-accuracy network-trilateration device locations. Location trace 403 (Z marks) exhibits medium-low location entropy and high location revisits which indicates the use of low-accuracy sector-location device locations. A clustering algorithm may classify trace 401-403 by comparing the statistical features of traces 401-403 (location entropy, block entropy, location revisits, and radii of gyration) to the statistical features associated with known geographic accuracy categories.

Figure 5:
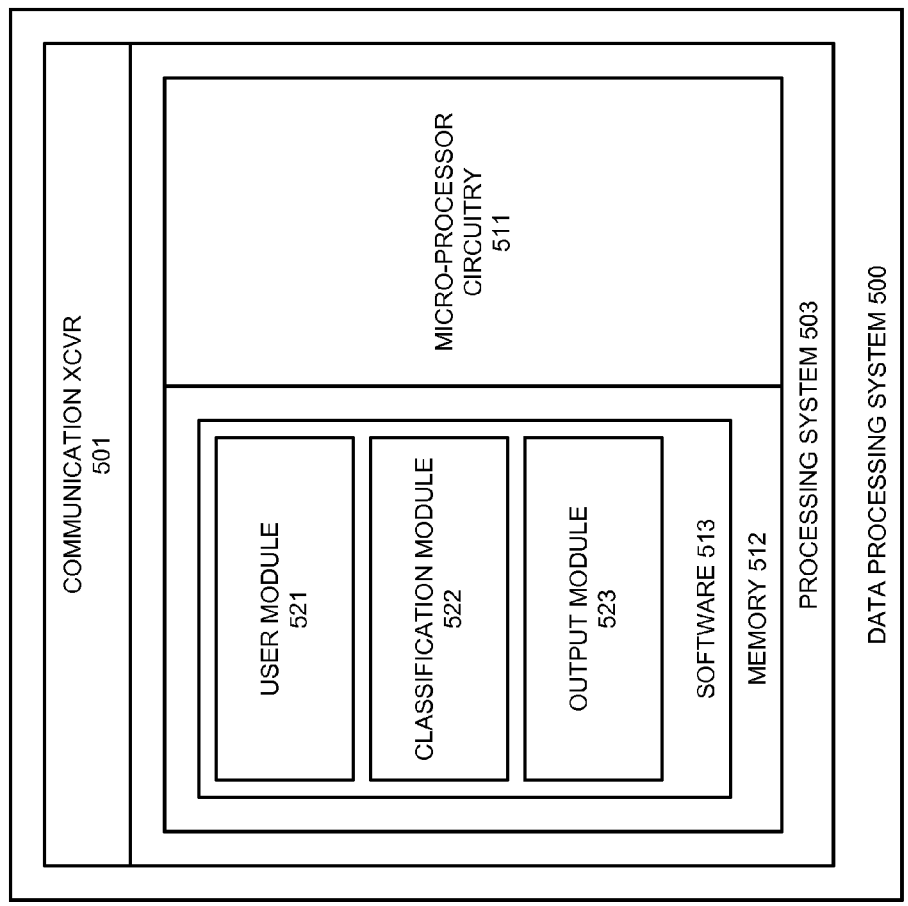
FIG. 5 illustrates a data processing system to generate geographic accuracy metrics for applications in wireless communication devices.

FIG. 5 illustrates data processing system 500 to generate geographic accuracy metrics for applications in wireless communication devices. Data processing system 500 is an example of the data processing system 130, although system 130 may use alternative configurations. Data processing system 500 comprises communication transceivers 501 and processing system 503. Processing system 503 comprises micro-processing circuitry 511 and memory 512. Memory 512 stores software 513. Data processing system 500 may be integrated into a single platform or may be distributed across multiple diverse computer and communication systems. Some conventional aspects of data processing system 500 are omitted for clarity, such as power supplies, enclosures, and the like.

Communication transceivers 501 comprise communication components, such as ports, circuitry, memory, software, and the like. Communication transceivers 501 typically utilize Ethernet, Internet, or some other networking protocol suitable for network information systems—including combinations thereof.

Micro-processor circuitry 511 comprises circuit boards that hold integrated circuitry and associated electronics. Memory 512 comprises non-transitory, machine-readable, data storage media, such as flash drives, disc drives, and the like. Software 513 comprises machine-readable instructions that control the operation of micro-processor circuitry 511 when executed. Software 513 includes modules 521-523 and may also include operating systems, applications, utilities, databases, and the like. Micro-processor circuitry 511 and memory 512 may be integrated into a single computer system or may be distributed across multiple computer systems. All or portions of software 513 may be externally stored on flash drives, discs, servers, and the like.

When executed by circuitry 511, user module 521 directs circuitry 511 to process network data to identify device/application pairs and their stationary-device location traces as described herein. When executed by circuitry 511, classification module 522 directs circuitry 511 to process the stationary-device location traces to classify the geographic accuracy of the device/application pairs as described herein. When executed by circuitry 511, output module 523 directs circuitry 511 to aggregate the classifications for the pairs per application to indicate geographic accuracy for individual applications as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a data processing system to determine geographic accuracy categories for device applications executed by wireless communication devices, the method comprising:
    associating geographic device locations with the geographic accuracy categories comprising Global Position Satellite (GPS), network trilateration, and network transceiver location;
    aggregating the geographic accuracy categories for the device applications based on the geographic device locations used by the device applications and the association of the geographic device locations with the geographic accuracy categories; and
    generating geographic accuracy metrics for the individual device applications based on the aggregations.

2. The method of claim 1 wherein associating the geographic device locations with the geographic accuracy categories comprises processing geographic entropy of the geographic device locations.

3. The method of claim 1 wherein associating the geographic device locations with the geographic accuracy categories comprises processing location revisits of the geographic device locations.

4. The method of claim 1 wherein associating the geographic device locations with the geographic accuracy categories comprises processing radii of gyration of the geographic device locations.

5. The method of claim 1 wherein the device applications comprise search applications.

6. A software apparatus to direct a data processing system to determine geographic accuracy categories for device applications executed by wireless communication devices, the software apparatus comprising:
    a processor; and
    one or more non-transitory computer readable media coupled to the processor storing instructions that when executed by the processor, cause the apparatus to:
    to associate geographic device locations with the geographic accuracy categories comprising Global Position Satellite (GPS), network trilateration, and network transceiver location;
    to aggregate the geographic accuracy categories for the device applications based on the geographic device locations used by the device applications and the association of the geographic device locations with the geographic accuracy categories; and
    to generate geographic accuracy metrics for the individual device applications based on the aggregations.

7. The software apparatus of claim 6 wherein the software is configured to direct the data process system to process geographic entropy of the geographic device locations.

8. The software apparatus of claim 6 wherein the software is configured to direct the data process system to process location revisits of the geographic device locations.

9. The software apparatus of claim 6 wherein the software is configured to direct the data process system to process radii of gyration of the geographic device locations.

10. The software apparatus of claim 6 wherein the device applications comprise search applications.

* * * * *